Nov. 11, 1969  C. P. HANKUS  3,477,897
ARTIFICIAL TREE
Filed Feb. 18, 1966
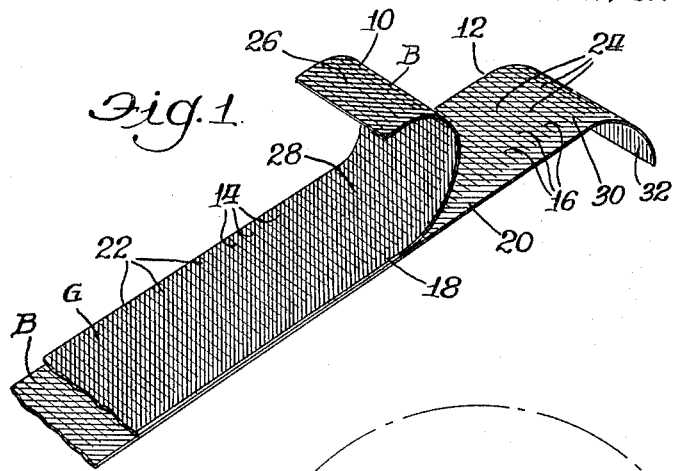
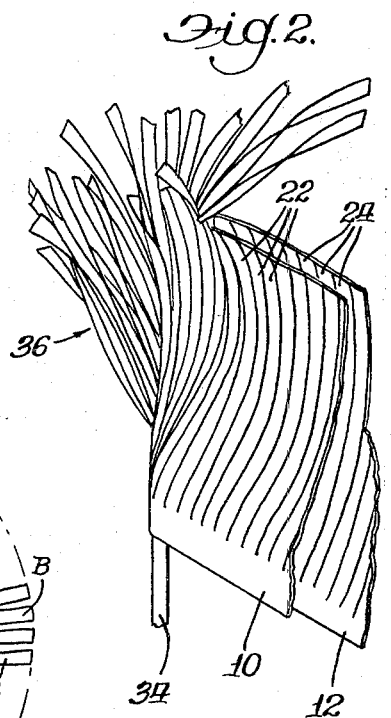
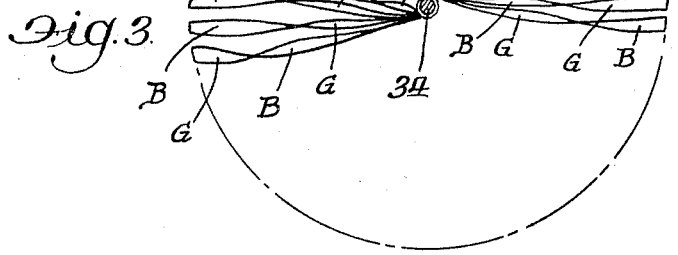
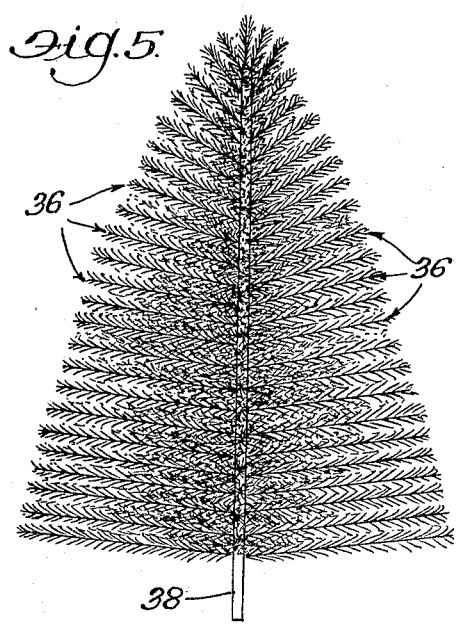
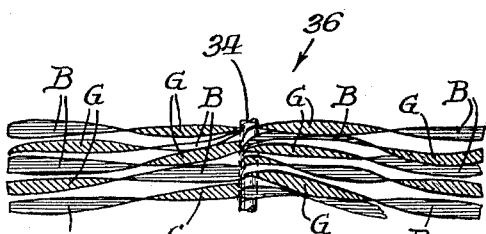
Inventor:
Chester P. Hankus
By: Paul H. Gallagher
Atty.

United States Patent Office 3,477,897
Patented Nov. 11, 1969

3,477,897
ARTIFICIAL TREE
Chester P. Hankus, Calumet Park, Ill.
(13210 S. Western Ave., Blue Island, Ill. 60406)
Filed Feb. 18, 1966, Ser. No. 528,466
Int. Cl. A47g 33/06
U.S. Cl. 161—22               2 Claims

ABSTRACT OF THE DISCLOSURE

Artificial tree with branches formed by colored strips wrapped around rods, the strips being slitted transversely to form needles, the strips each being of different color effect on opposite sides, and the strips being arranged in pairs with the colors of those of each pair mutually opposite.

---

The present invention relates to an artificial tree.

The invention relates to that kind of artificial tree having branches which include foil strips which are slitted to form laterally extending needles, the strip being wound around a branch rod and the needles extending generally outwardly from that rod similarly to a natural tree.

A broad object of the invention is to provide a novel form of artificial tree which provides an entirely new effect in appearance.

A more specific object is to provide an artificial tree of the foregoing general character in which the foil strips, and the needles formed therefrom, are of different colored effects on opposite sides, and the strips are arranged in a novel manner to present different color effects in the finished product.

A more specific object is to provide an artificial tree of the foregoing general character in which each of the foil strips is of different colors, or color effects, on opposite sides, and the strips are arranged in pairs with the strips of each pair in opposed relation to provide relatively uniform color effects.

A further object is to provide a method of making an artificial tree of the foregoing general character, and of producing a novel color effect therein.

Other objects and advantages of the invention will appear from the following detail description taken in conjunction with the accompanying drawings wherein—

FIGURE 1 is a perspective view of a pair of foil strips showing the manner in which they are fitted together for incorporation in the tree branch;

FIGURE 2 is a perspective view showing the manner of applying the two foil strips of FIGURE 1 to a branch rod;

FIGURE 3 is a partial end view of the completed branch;

FIGURE 4 is a partial side view of the completed branch; and

FIGURE 5 is a view showing a complete tree incorporating a plurality of the branches illustrated in the previous figures.

The present disclosure includes various features of certain of my previous inventions and covered by United States Patents, such for example as Nos. 2,889,650, 3,067,797, and 3,069,192 to which reference may be had for a disclosure of complete details of the artificial tree and method of making it. The present invention is directed to a specific arrangement of foil strips relatively positioned and incorporated in a tree branch for producing a novel color effect. Two such strips are shown at 10 and 12 respectively and may be of aluminum foil, or other material. Aluminum foil at the present time is the preferred material, and the following description will be based on that fact, however it is to be understood that the invention is sufficiently broad to cover any of various kinds of foil or sheet material such as plastic material. The strips 10, 12 are elongated preferably on the order of 4" wide and of indefinite length. The strips are cut in from one edge along lines 14 and 16 respectively, these cut lines terminating short of the opposite edge leaving continuous and uncut retaining strips 18 and 20 the full length of the strips, forming fingers 22 and 24 secured to and extending from the continuous strips 18 and 20, these fingers in the final product forming the needles of the branches of the tree.

Each foil strip 10, 12, is of different color on opposite sides, the sides of the strip 10 being identified as 26 and 28 while the opposite sides of the strip 12 are identified as 30 and 32. If desired the two strips may be of the same kind i.e., having the same two colors on opposite sides, or they may of course be of different colors. In the accompanying drawings, the shading on the strips represents contrasting colors, and not any specific colors. In the composition of the tree, the strips 10, 12 are positioned with the two surfaces 26, 30 respectively of the same color butted face-to-face, while the other and opposite surfaces 28, 32 of a different color are directed outwardly. The two strips, fitted together as indicated in FIGURE 1, are then applied to a branch rod 34 of suitable material and structure as disclosed in my Patent No. 2,889,650 identified above. The two strips, so positioned, are secured to the upper end of the branch rod and then wound helically thereon throughout the greater part of the length of the rod. In this application of the strips to the branch rod, the continuous elements 18 and 20 are secured to the rod and the fingers 22, 24 extend outwardly therefrom, in a generally radial direction, although displaced from a true radial position due to their curled and twisted condition which is provided in accordance with the teachings of my patents, Nos. 2,889,650 and 3,067,797 referred to above. These fingers, when the strips are applied to the rod, form needles of the branch, closely simulating the needles of a natural tree.

The twisted and curled condition of the needles presents an unusual and striking effect in the completed branch. In the case of a single strip, if one side of the strip is blue and the other side green, the branch at different positions therealong presents different colors; blue may be predominant at the center of the branch next to the rod, and then due to the twisting and curling of the needles, green will be predominant at the outer ends of the needles. This difference in color is present whether the branch is viewed from the end as in FIGURE 3 or from the side as in FIGURE 4. The colors change gradually from one point to another, according to the twist of the needles but, however, following a general overall pattern. Also when such a branch made with a single strip is viewed from the side for example, one side of the branch would be generally of one color while the other side of the branch would be of the color of the other side of the strip, with of course variations.

The present invention presents a most striking effect in eliminating this difference in color just referred to, and in producing a very generally uniform mixture of colors throughout the area thereof. The two strips in being wound on the branch rod, may be exactly in register, or may be offset slightly, as desired, but in either case the fingers or needles of the two strips present opposite colors to a single viewpoint at all positions radially of the branch so that for every area of one color that is presented, a corresponding area of the other color is presented in generally the same direction. The two colors are thus distributed substantially the same extent and in the same manner throughout the area of the branch. In this way the extreme change as between colors, in previous trees made of a single strip of foil, is eliminated. However in the present instance the two different colors are fully visible and evident throughout the complete area of the branch. FIGURES 3 and 4 represent this distribution of colors, where it will be seen that two colors G and B (green and blue, chosen at random) are visible on each and every needle, from a single viewpoint. Additionally, for every color on one needle at each location, there is the other color on another needle closely adjacent thereto.

The foregoing description has made reference to "color" but the invention is sufficiently broad to cover similar effects which may also be known as color effects. For example the color of the opposite sides of the foil may be generally the same, but the texture different so that the two sides actually present different color eflects in the tree. This difference in color effect may be due partially to light conditions as well as differences in texture.

The invention covers a construction utilizing, for example, only two colors, where all the strips are of the same two colors on opposite sides and it is also within the compass of the invention that the two strips are not of the same two colors but they may involve four different colors. There is no limit to the colors that may be used.

FIGURE 5 illustrates a complete tree, it being understood that the branches, now identified as 36, made according to the foregoing description are mounted in a trunk or pole 38 such as disclosed in my Patents Nos. 2,889,650 and 3,069,192, referred to above.

While I have shown and described herein a preferred form of the invention it will be understood that changes may be made therein within the spirit and scope of the appended claims.

I claim:
1. An article of the character disclosed comprising a branch rod, and a plurality of metal foil strips each having laterally extending needles, and each being of different color effect on opposite sides, the strips being wound on the branch rod with the needles thereof extending outwardly from the branch rod to simulate the needles on a natural tree, the individual needles being displaced from planar shape progressing from the branch rod to their outer ends, and the strips being arranged with the various color effects of the two strips disposed differently to a common point of view.

2. An article according to claim 1 wherein each metal foil strip is helically wound on the branch rod whereby the series of each strip lie in the path of a helix throughout the length of the branch rod, the needles of each strip being spaced apart along the axis of the branch rod and helix, and further wherein the plurality of strips on each branch rod are arranged with mutually opposing faces having similar color effect and mutually oppositely directed faces having similar color effect, but different from that of the mutually opposed faces.

References Cited

UNITED STATES PATENTS

| 2,889,650 | 6/1959 | Hankus | 161—24 |
| 360,000 | 2/1887 | Darnall | 161—24 |

JACOB H. STEINBERG, Primary Examiner

U.S. Cl. X.R.

161—24